United States Patent [19]

Nagai

[11] Patent Number: 4,636,630
[45] Date of Patent: Jan. 13, 1987

[54] PHOTOELECTRIC TYPE DISPLACEMENT DETECTION APPARATUS

[75] Inventor: Ryo Nagai, Kanagawa, Japan

[73] Assignee: Mitutoyo Mfg. Co., Ltd., Tokyo, Japan

[21] Appl. No.: 681,225

[22] Filed: Dec. 13, 1984

[30] Foreign Application Priority Data

Dec. 16, 1983 [JP] Japan ............................. 58-237552
Mar. 12, 1984 [JP] Japan ............................. 59-047553

[51] Int. Cl.$^4$ ............................................. H01J 40/14
[52] U.S. Cl. ............................. 250/214 R; 250/237 G
[58] Field of Search .............. 33/125 C; 250/214 R, 250/231 SE, 237 G, 551, 552; 340/347 P; 356/395

[56] References Cited

U.S. PATENT DOCUMENTS 4,310,755 1/1982 Miller ........................... 250/214 R Primary Examiner—Eugene R. LaRoche
Assistant Examiner—James C. Lee
Attorney, Agent, or Firm—Koda and Androlia

[57] ABSTRACT

A photoelectric type displacement detecting apparatus, such as a digital display dial gauge micrometer, with an improved frequency response, comprising optical lattice means, light emitting means for irradiating the optical lattice means with a detecting light, light receiving means for receiving a transmission or reflective light from the optical lattice means, and a detection circuit for generating an output signal indicative of relative movement in the lattice. The frequency characteristic of a phototransistor adapted in the light receiving means depends on the input impedance of a base-grounded transistor to maintain the current supplied to the light emitting means constant and to improve the frequency response in the detection apparatus.

3 Claims, 6 Drawing Figures

PHOTOELECTRIC TYPE DISPLACEMENT DETECTION APPARATUS

BACKGROUND OF THE INVENTION

1. Field of the Invention

The present invention relates to a photoelectric type displacement detection apparatus which can particularly effect detection in a stable manner with improved frequency response.

2. Prior Art

There are currently used various photoelectric type displacement detecting systems having excellent measurement accuracy and durability, such as digital display dial gauge micrometers, three-dimensional length measuring systems, table feed systems of laser mikes or NC machine tools for measuring distance or other dimensions utilizing laser beams, etc.

FIG. 1 shows the primary part of such a type of displacement detecting system, in which a main scale 10 a glass plate, a stainless steel sheet or other includes a plurality of length measuring slits 10a and absolute value indicating slits 10b formed therein and spaced away from one another. The desired length measurement or position detection may be carried out along the main scale 10.

Near the main scale 10 are disposed an index scale 12 and an absolute value scale 13. The index scale 12 includes index slits 12a and 12b corresponding to the length measuring slits 10a while the absolute scale 13 includes index slits 13a corresponding to the absolute value indicating slits 10b. Upon relative movement between the scales 10, 12 and 13 (optical lattice means), the movement of the slits is electrically detected to provide a relative movement signal on which a measurement of length or detection of position can be accomplished.

To convert the relative movement of the scales 10, 12 and 13 into a photoelectrical signal, light emitting and receiving elements ae arranged near the respective scales 10, 12 and 13. The illustrated system is a transmission type measuring apparatus in which light emitting elements 14a, 14b and 14c are located near the main scale 10, light receiving elements 16a and 16b are disposed near the index scale 12, and a light receiving element 16c is arranged near the absolute value scale 13. These elements 14 and 16 are positioned at locations opposed to the index slits 12a, 12b and 13a, respectively. As is well known, the groups of index slits 12a and 12b are offset relative to each other by a half-pitch so that light beams transmitted to each of the scales 10 and 12 will be detected as sine or cosine wave signals. These out-of-phase signals can be used to realize the desired dividing action.

The absolute value scale 13 may generate an absolute value output signal indicative of the absolute position of the moved main scale 10 in co-operation with the absolute value slits 10b provided on the main scale 10 and spaced away from one another. Thus, an operator can know an absolute position of the absolute scale 13 relative to the main scale 10.

In such a manner, the prior art system is operated to make photoelectric conversion of the displacement with the resulting relative movement signal undergoing the necessary process through such a circuit as shown in FIG. 2.

FIG. 2 shows an example of the displacement detecting system applied to a length measuring device. The displacement signal of relative movement from each of the light receiving elements 16 is amplified through a corresponding preamplifier 18a, 18b or 18c and then supplied to a detection circuit 20. The detection circuit 20 comprises a waveform shaper circuit 22 and a division circuit 24. As is well known, the division circuit 24 may combine the sine and cosine wave signals with each other to divide the combined signal into signals having a measurement pitch smaller than the slit widths of the scales 10 and 12.

The output of the detection circuit 20 is supplied to a digital display 28 through a counter 26 such that the measured length will digitally be indicated. This measured length may be recorded by a printer 30, if necessary.

The three light emitting elements 14a, 14b and 14c are connected with a power supply through resistances 31a, 31b and 31c, respectively.

In the displacement detection system mentioned above, the quantity of light from the light emitting elements 14 must be constant at all times because of its increased influence on the characteristics of the photoelectric conversion section. For example, in such a system as shown in FIG. 2, the resistances 31 connected with the respective light emitting elements 14 were finely adjusted to equalize the quantity of light from the light emitting elements 14. At the same time, if necessary, the pre-amplifier 18 could be adjusted to effect the initial adjustment of the detection output signals supplied to the detection circuit 20.

In the prior art systems, however, if the voltage at the power supply is varied, the quantity of light will correspondingly be changed in spite of the initial adjustment prior to the aforementioned measurements, resulting in frequent generation of errors in the detected values.

The prior art displacement detection systems were generally utilized to control the feed of a table in a conventional NC machine tool in which a sensor was provided in each of the NC moving shafts, these sensors being collectively controlled through a power supply, operation switch or indicator which was mounted on the stationary part of the machine.

FIG. 3 illustrates an example of such NC control systems. Each X-, Y- and Z-section of the NC machine tool includes such a photoelectric type displacement detection device as shown in FIGS. 1 and 2. Each of the axially moving parts includes a light emitting element 14a, 14b or 14c, a light receiving element 16a, 16b or 16c, and a pre-amplifier 18a, 18b or 18c. These components are housed within a movable housing 32.

On the other hand, a stationary housing 34 includes a power supply 36, a detection circuit 20 and displays 38, 40 and 42 for the respective shafts.

The movable housing 32 is provided on each of the X-, Y- and Z-sections and mounted on the corresponding NC feed shaft. The movable housing 32 is electrically connected with the stationary housing 34 through a cable 44. Such a split type detection system can include a common power supply, a common group of operation switches and a common display, resulting in reduction of dimensions in the system.

In the split type detection system, however, there are cables 44 of different lengths connecting the stationary and movable housings 34 and 32. Moreover, if a plurality of movable X-, Y- and Z-sections as shown in FIG. 3 are provided the length of the cable for each shaft will be varied during operation. Even if the voltage on the stationary side is maintained constant, the quantity of light in the light emitting elements of the respective movable sections becomes irregular when the voltage in the corresponding cable 44 lowers. As a result, errors in measurement will not be negligible.

To overcome such problems, it has been proposed to have a voltage detector and a separate power voltage control or constant power supply, all of which are housed within a movable slider unit. However, this requires a plurality of similar cables for conducting detected voltages and other complicated structures including the voltage detector, resulting in noises generated in the voltage detection and control lines. Furthermore, the separate power supply will adversely affect the movement of the slider unit and undesirably increase the dimensions of the system.

In the aforementioned construction including a plurality of movable detection sections, for example, if the voltage in the power supply on the stationary side is five volts, the actual voltage in the movable slider unit would be decreased 4%–6% due to loss in the cables resulting in 10%–15% reduction in the light quantity of the light emitting elements. In addition, the quantity of light may be reduced about 20% when it is considered that the variations in the voltage of the stationary power supply is in the range of about 5%. This provides a remarkable degradation of SN ratio in the light measuring signals and then adversely affects the accuracy in measurement.

Although the prior art systems can utilize, for the desired purpose, electric output signals indicative of information of length or position which are obtained by the photoelectric conversion of the relative movement between the main scale 10 and the index scale 12, this may raise another severe problem with respect to responsibility in recently developed high-precision detecting systems.

Moreover, reduction in power consumption is increasingly being desired, particularly, in a portable system such as battery-operated length meters and others. The photoelectric conversion systems normally provide the increase of power consumption in the light emitting elements which is desired to decrease.

In the arrangement of scales as shown in FIG. 1, it is required that the clearance between each adjacent scales moved relative to each other is increased to facilitate the assembling and machining of the components.

Due various factors mentioned above, detection systems tend to decrease the quantity of light received by the light receiving elements. For positive and sufficient phase detection even by the use of very small received signals, various ideas have been adopted in the detection circuit 20 connected with the light receiving elements.

To this end, as shown in FIG. 4, a load resistor 46 having a relatively large resistance $R_L$ is normally connected with the emitter of a light receiving element 16. A voltage $V_o$ is brought from between this emitter and the load resistor 46. This is a detected voltage having such a value that can easily be processed in the proceeding step.

However, the load resistor 46 having its large resistance $R_L$ raises a problem in that its response frequency is severely limited if the light receiving element 16 used is a phototransistor. As shown in FIG. 4, the response frequency f of the phototransistor 16 is determined by the following relationship:

$$f = 1/(2\pi C_j R_L)$$

where $C_j$ is the electric capacity of the phototransistor 16. As will be apparent from the above formula, increase of the load resistance $R_L$ results in reduction of response frequency f. In prior art systems, the reduction of power consumption is not compatible with improvement of response frequency.

SUMMARY OF THE INVENTION

It is therefore an object of the present invention to provide an improved photoelectric type displacement detection apparatus which can provide improved frequency response without increase in power consumption and at the same time maintain the quantity of light from the light emitting elements constant to increase detection speed in spite of variations in the voltage source or loss in the cables.

To accomplish the above object, the present invention is characterized by the fact that light emitting means is connected with a power supply through a transistor and resistance to form a light emitting circuit connected with a constant-voltage circuit which includes a shunt regulator, the cathode input of the shunt regulator being connected with the base of the transistor with the constant-voltage end thereof being connected with the emitter of the transistor, and light receiving means including a phototransistor being cascade-connected with a base-grounded transistor with the collector thereof being connected with a ground through a load resistor and capable of generating a signal indicative of relative movement, whereby the frequency characteristic of the phototransistor can depend on the input impedance of the base-grounded transistor to maintain the current supplied to the light emitting means constant and to improve the frequency response.

DETAILED DESCRIPTION OF THE INVENTION

Figure 1:
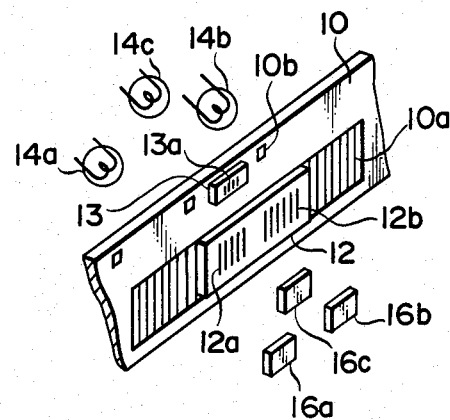
FIG. 1 is a perspective view of the primary part of a slider section in a conventional photoelectric type displacement detection system.
Figure 2:
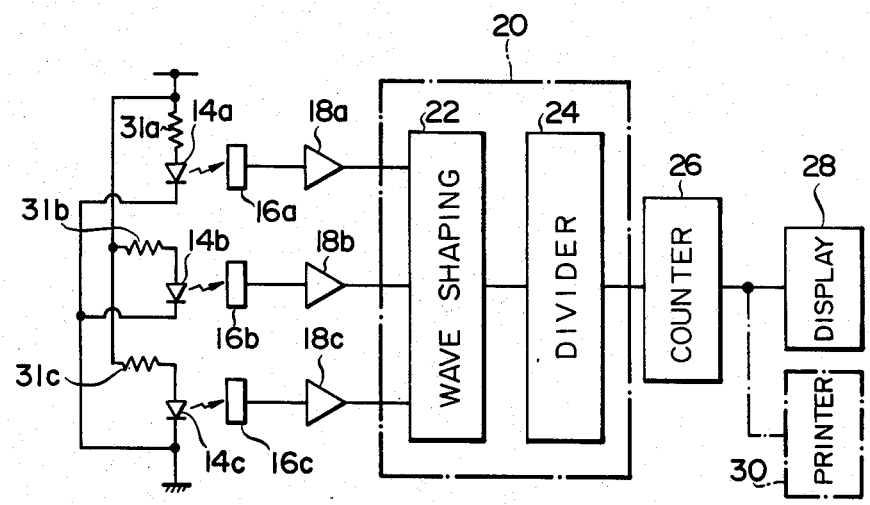
FIG. 2 is a block diagram of a processing circuit suitable for use in the system shown in FIG. 1.
Figure 3:
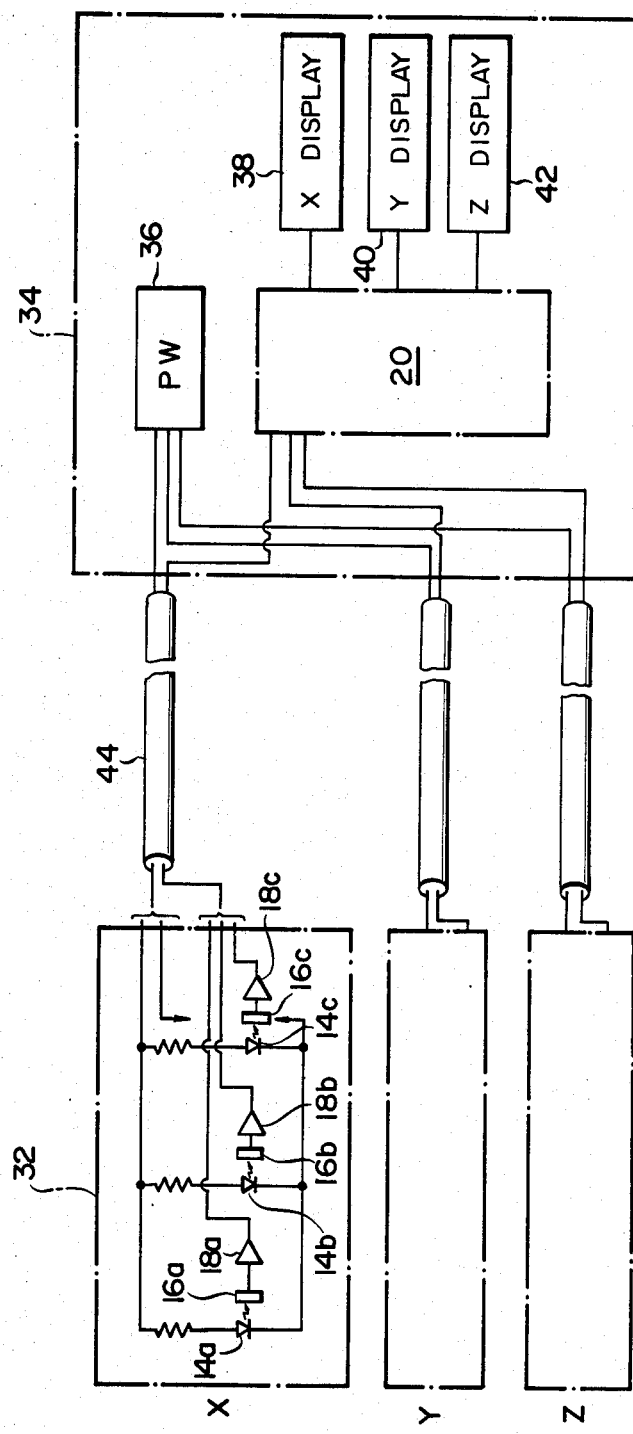
FIG. 3 illustrates an example of the detection device divided into stationary and movable parts and used in one of the conventional NC machine tools.
Figure 5:
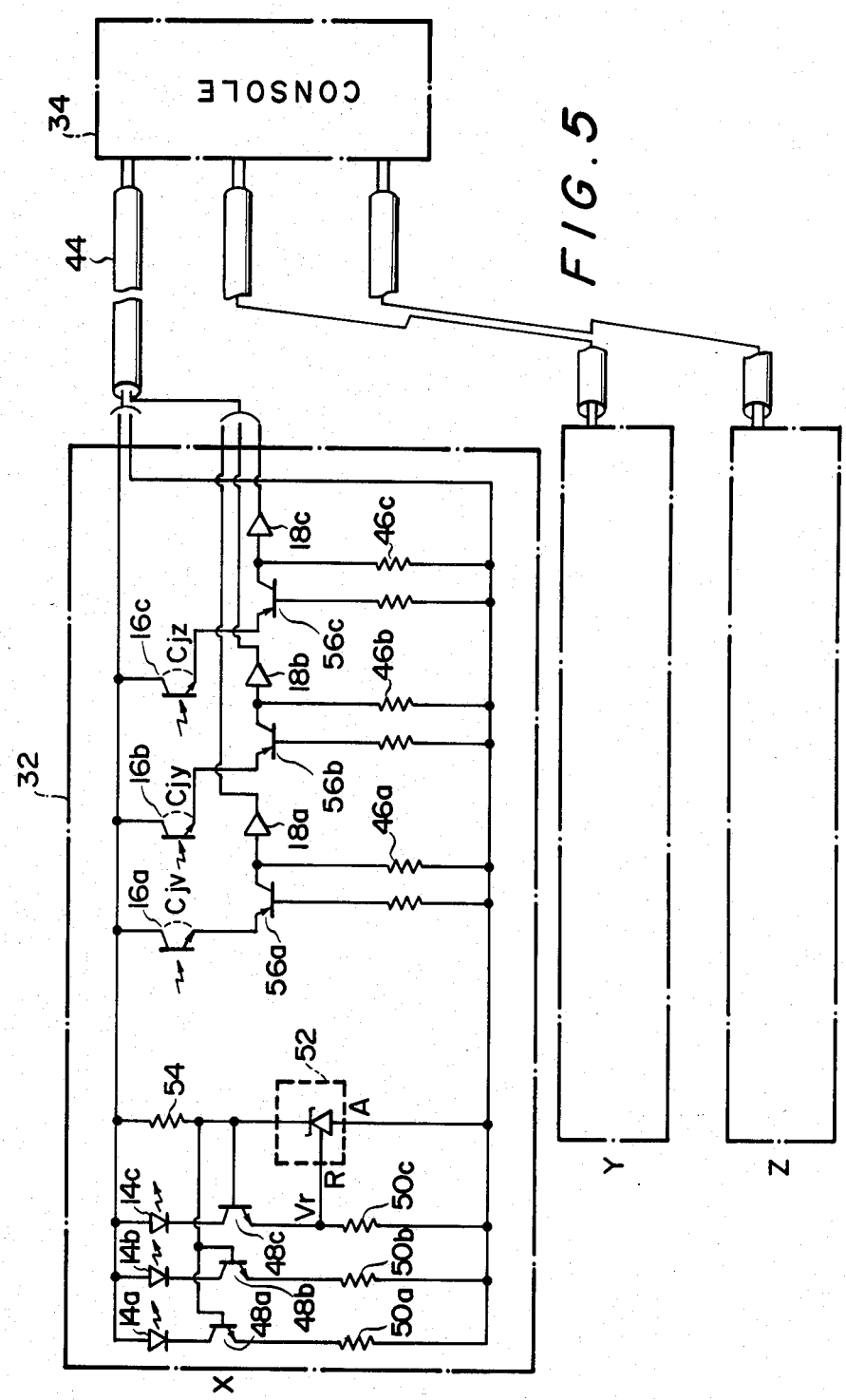
FIG. 5 is a diagram showing a preferred embodiment of the displacement detection apparatus according to the present invention, which is used in the NC machine tool.

Referring now to FIG. 5, there is shown a three-shaft split type NC machine tool to which a displacement detection apparatus according to the present invention is applied. In FIG. 5, parts similar to those of FIG. 3 are designated by similar reference numerals and will not further be described below.

The present invention is characterized by light emitting elements 14 energized through a constant-current circuit which comprises transistors 48a, 48b and 48c and resistors 50a, 50b and 50c connected in series with the respective light emitting elements 14. Thus, this light emitting circuit receives an unstably variable power from the stationary side.

In accordance with the present invention, the light emitting circuit is connected with a constant-voltage circuit including a shunt regulator 52 such that the constant-current light emitting circuit including the aforementioned transistor 48 can be stabilized. In the illustrated embodiment, the shunt regulator 52 is TL431C commercially available from T.I. Company and has its constant-voltage terminal R generating a constant voltage. The cathode/input terminal K of the shunt regulator 52 is connected with the positive terminal of a power supply. The anode terminal A thereof is connected with the negative terminal of the same power supply.

In accordance with the present invention, moreover, the cathode/input terminal K of the shunt regulator 52 is also connected with the bases of the respective transistors 48 which in turn are connected at their emitters with the aforementioned constant-voltage terminal R.

The light receiving elements 16 shown in FIG. 5 are in the form of a phototransistor (for example, PT501:Sharp Corporation). The collector of each of the phototransistors 16 is connected with the power supply with the emitter thereof being connected with the corresponding load resistor 46 through a base-grounded transistor 56, as shown also in FIG. 6. In other words, each of the light receiving elements or phototransistors 16 is coupled with the corresponding load resistor 46 after impedance conversion in the base-grounded transistor 56 which is cascade-connected with the corresponding phototransistor 16.

Figure 6:
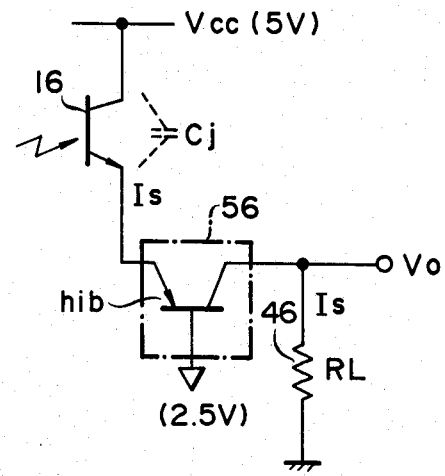
FIG. 6 is a circuit diagram of the primary part of a photoelectric type displacement detecting apparatus which is a preferred embodiment of the present invention.

As is apparent from FIGS. 5 and 6, the emitter of each of the phototransistors 16 is connected with the emitter of the corresponding transistor 56 the base of which is connected with a ground. The collector of this transistor 56 is grounded through the corresponding load resistor 46. A detection voltage is brought from between the collector of the base-grounded transistor 56 and the corresponding load resistor 46.

The system constructed according to the present invention will now be described with respect to its operation.

A current i supplied to the light emitting element or diode 14c under the constant-voltage action of the shunt regulator 52 can be determined from the following formula:

$$i = V_R/r$$

where r is the value of the resistance 50c and $V_R$ is the voltage at the constant-voltage terminal R of the shunt regulator 52.

Therefore, the shunt regulator 52 can generate constant voltage $V_R$ at the constant-voltage terminal R thereof in spite of variations in cable length or power voltage by connecting the constant-voltage circuit utilizing the shunt regulator 52 with the constant-current light emitting circuit. Thus, the supplied current i for light emission can be maintained constant at all items.

Even when the characteristic inherent in each transistor 48 is varied to a small degree due to variations in temperature or other variations, the cathode/input K of the shunt regulator 52 can alter depending on the above variations such that the voltage $V_R$ at the constant-voltage terminal R will be maintained constant. In the illustrated embodiment, the cathode/input terminal K of the shunt regulator 52 is connected with the bases of the respective transistors 48. Accordingly, the reference voltage at the constant-voltage terminal R can be coupled with a single light emitting circuit, that is, that of the light emitting element 14c such that the other light emitting circuits will receive the desired constant-current from the base inputs of the transistors 48a and 48b. It is thus possible to provide a common constant current supplied to all the light emitting elements 14.

In accordance with the present invention, it goes without saying that the shunt regulator 52 may be provided for the light emitting circuit of each of the light emitting elements 14a, 14b and 14c.

It is actually preferred that the transistors 48a, 48b and 48c are of substantially the same characteristic and that the resistances 50a, 50b and 50c are initially adjusted to show the same value.

Since the constant-value circuit including the shunt regulator is used to control the current supplied to the light emitting elements in accordance with the present invention, it is possible that an unvariable quantity of light is obtained at all times even against the factors of voltage variations due to the variations of the cable length and others to accomplish good accuracy in detection.

Although each of the output resistors 46 shown in FIG. 5 has a relatively large resistance $R_L$ as in the prior art, the input impedance hib of the base-grounded transistor 56 can sufficiently be smaller than the resistance $R_L$ by the impedance conversion therein. In accordance with the present invention, therefore, the response frequency f in each of the light receiving phototransistors 16 is:

$$f = 1/(2\pi Cj\ hib)$$

This means that response frequency can remarkably be improved since input impedance hib is sufficiently smaller than the resistance $R_L$.

Figure 4:
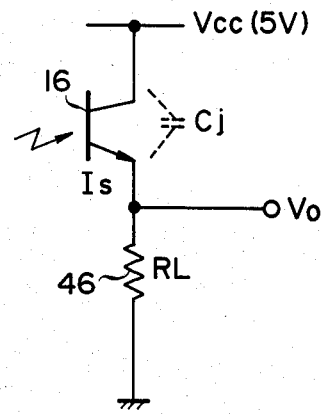
FIG. 4 is a circuit diagram showing a conventional light receiving element and part of the detection circuit.

To compare the prior art system of FIG. 4 with the embodiment of the present invention shown in FIG. 6, it was selected such that they include 5 volts of power voltage Vcc, phototransistors (PT501:Sharp Corporation) as light receiving elements and 5 kilo-ohms of load resistors $R_L$. The prior art system provided its response frequency of 25 KHz. On the contrary, the system of the present invention provided its response frequency of 100 KHz when the cascade-connected transistors are 2SA1048 (Toshiba Corporation) and the base-grounded voltage is 2.5 volts.

This improved response frequency can cause the relative movement of each of the adjacent parts to increase in speed. For example, if each slit in the main and index scales has a light transmission length of 10 microns and a light blocking length of 10 microns, the speed of relative movement in the prior art system is limited to 500 mm/sec, while the system according to the present invention can provide a speed of relative movement up to 2000 mm/sec. This improvement can sufficiently be fulfilled in the automatic feed of the recent high-speed NC machine tools.

By the constant-voltage circuit including the shunt regulator incorporated into the housing 32 in the movable slider unit, a constant current may be supplied near the respective light emitting circuits. This is extremely preferred in detection systems split into stationary and movable sections.

Similarly, the present invention may be applied to any hologram scale system having no index scale.

It is apparent from the foregoing that the present invention can eliminate any variation in current supplied to the light emitting elements due to various factors such as variations in power voltage, etc. and at the same time improve frequency response without an increase in power consumption to increase the speed of detection by the fact that the light emitting elements are connected with the constant-current circuit and also cascade-connected with the base-grounded transistors.

When the optical lattice is used at a feed speed below a predetermined level, the dividing circuit may be simplified by decreasing the slit width of the optical lattice, compared with the prior art.

I claim:

1. A photoelectric type displacement detecting apparatus for detecting relative displacement between members movable relative to each other comprising optical lattice means, light emitting means for irradiating said optical lattice means with a detecting light, a light receiving means for receiving a light from said optical lattice means, and a detection circuit for generating an output signal indicative of relative displacement between said members being moved relative to each other in accordance with an output from said light receiving means, said apparatus being characterized in that said light emitting means is connected with a power supply through a collector-emitter path of a transistor and a resistor to form a light emitting circuit, said light emitting circuit being connected to a constant-voltage circuit including a shunt regulator, a cathode/input terminal of said shunt regulator being connected to a base of said transistor with a constant-voltage terminal of said shunt regulator being connected with the emitter of said transistor and that said light receiving means includes a phototransistor cascade-connected to an emitter of a grounded-base transistor, the collector of said grounded-base transistor being grounded through a load resistor and also connected to the detection circuit so that said output signal indicative of relative displacement will be detected at the collector terminal of said grounded-base transistor by the detection circuit, whereby the frequency characteristic of said photo-transistor depends on the input impedance of said grounded-base transistor to maintain the current supplied to said light emitting means constant and to improve the frequency response in said detection apparatus.

2. A photoelectric type displacement detecting apparatus as defined in claim 1, wherein said optical lattice means, light emitting circuit and light receiving means are housed within a first housing on the movable section and wherein said detection circuit and said power supply for driving said light emitting means are housed within a second housing on the stationary section and wherein said first and second housings are connected with each other through cable means such that the first housing is movable, and said constant-voltage circuit being housed within said first housing.

3. A photoelectric type displacement detecting apparatus as defined in claim 1 or 2, wherein said movable housing contains a plurality of light emitting circuits and wherein the cathode input of the shunt regulator in a single constant-voltage terminal of the shunt regulator is connected with the emitter of one of said light emitting circuits.

* * * * *